United States Patent
Trinh

(10) Patent No.: US 7,760,458 B1
(45) Date of Patent: Jul. 20, 2010

(54) DISK DRIVE ADJUSTING HEAD BIAS DURING SERVO SYNCHRONIZATION TO COMPENSATE FOR OVER/UNDER SENSITIVITY

(75) Inventor: Tuyen V. Trinh, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 224 days.

(21) Appl. No.: 12/190,512

(22) Filed: Aug. 12, 2008

(51) Int. Cl.
G11B 5/03 (2006.01)
(52) U.S. Cl. .............................. 360/66; 360/67; 360/46
(58) Field of Classification Search ........................ None
See application file for complete search history.

(56) References Cited

U.S. PATENT DOCUMENTS

| | | | |
|---|---|---|---|
| 3,879,674 A * | 4/1975 | Dragon | 330/280 |
| 4,914,398 A | 4/1990 | Jove et al. | |
| 5,283,521 A | 2/1994 | Ottesen et al. | |
| 5,412,518 A | 5/1995 | Christner et al. | |
| 5,418,660 A | 5/1995 | Sato et al. | |
| 5,420,513 A | 5/1995 | Kimura | |
| 5,790,334 A | 8/1998 | Cunningham | |
| 5,978,163 A | 11/1999 | Cunningham | |
| 6,111,715 A | 8/2000 | Tsuchiya et al. | |
| 6,115,201 A | 9/2000 | Enarson et al. | |
| 6,151,177 A | 11/2000 | Shrinkle et al. | |
| 6,169,638 B1 * | 1/2001 | Morling | 360/46 |
| 6,195,219 B1 | 2/2001 | Smith | |
| 6,262,572 B1 | 7/2001 | Franco et al. | |
| 6,262,858 B1 | 7/2001 | Sugiyama et al. | |
| 6,288,863 B1 | 9/2001 | Flinsbaugh | |
| 6,320,713 B1 | 11/2001 | Tretter et al. | |
| 6,341,046 B1 | 1/2002 | Peterson | |
| 6,452,735 B1 | 9/2002 | Egan et al. | |
| 6,473,257 B1 | 10/2002 | Shimazawa et al. | |
| 6,483,676 B2 | 11/2002 | Nakatani | |
| 6,512,647 B1 | 1/2003 | Quak et al. | |
| 6,512,648 B1 | 1/2003 | Tsuchiya et al. | |
| 6,574,061 B1 | 6/2003 | Ling et al. | |
| 6,603,340 B2 | 8/2003 | Tachimori | |
| 6,654,191 B2 | 11/2003 | Ottesen et al. | |
| 6,731,448 B2 | 5/2004 | Briskin et al. | |
| 6,751,039 B1 | 6/2004 | Cheng et al. | |
| 6,762,914 B2 | 7/2004 | Fox et al. | |
| 6,801,376 B2 | 10/2004 | Smith | |
| 6,903,889 B2 * | 6/2005 | Li et al. | 360/31 |
| 7,097,110 B2 | 8/2006 | Sheperek et al. | |
| 7,130,143 B1 | 10/2006 | Tretter | |
| 7,265,577 B2 | 9/2007 | Madurawe | |
| 7,480,115 B2 | 1/2009 | Hiroyuki et al. | |

(Continued)

*Primary Examiner*—Jason C Olson

(57) ABSTRACT

A disk drive is disclosed comprising a disk including a plurality of servo sectors, a head actuated over the disk, the head for generating a read signal, and a gain control circuit for adjusting a gain of the read signal in response to a gain setting. A bias setting is initialized for the head, and the gain setting for the read signal is initialized. The read signal is processed to detect at least one of the servo sectors, and when at least one of the servo sectors is not detected, the gain setting is adjusted. The read signal is processed with the adjusted gain setting to detect at least one of the servo sectors, and when at least one of the servo sectors is not detected with the adjusted gain setting, the bias setting is adjusted in response to the adjusted gain setting.

20 Claims, 4 Drawing Sheets

U.S. PATENT DOCUMENTS

2003/0169528 A1    9/2003  Lim et al.
2006/0119963 A1*   6/2006  Hidaka ........................ 360/31
2007/0297819 A1   12/2007  Hagiwara et al.
2008/0100948 A1    5/2008  Tretter

* cited by examiner

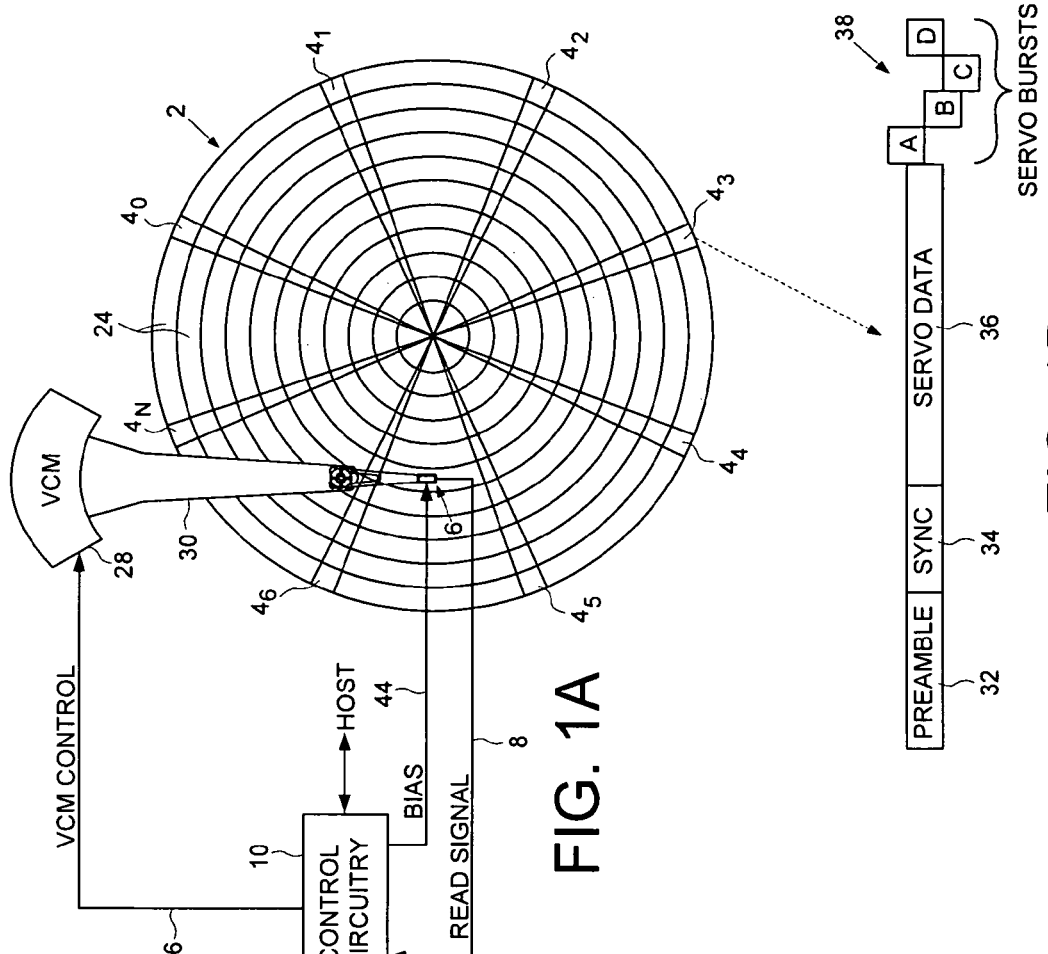
FIG. 1A
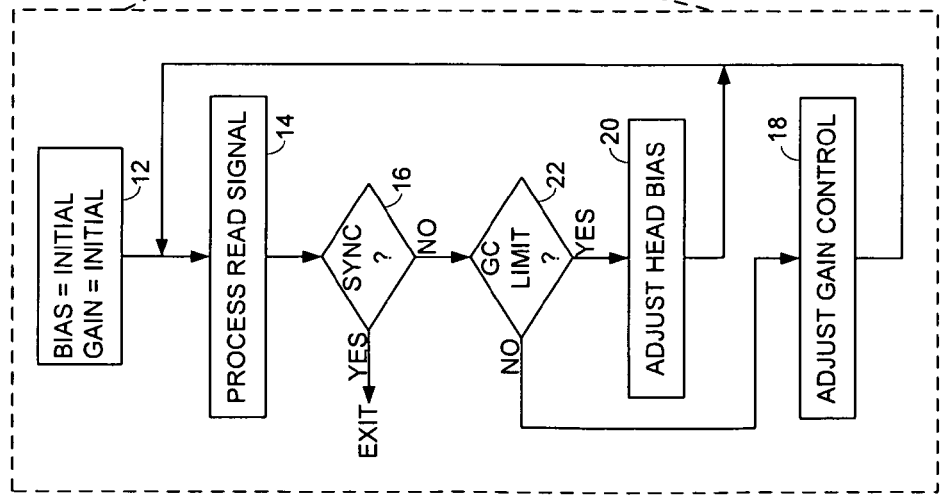
FIG. 1B
FIG. 1C

DISK DRIVE ADJUSTING HEAD BIAS DURING SERVO SYNCHRONIZATION TO COMPENSATE FOR OVER/UNDER SENSITIVITY

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track. When the disk drive is powered on, the control circuitry positions the head over the disk surface and then processes the read signal in order to detect and synchronize to sync marks in the embedded servo sectors. Once synchronized to the servo sectors, the control circuitry is able to identify and track the radial and circumferential location of the head while performing access operations.

Certain heads comprise a read element that requires a bias setting to operate properly. For example, magnetoresistive (MR) heads comprise an MR read element which must be biased to a desired operating level (e.g., using a bias current or bias voltage). The read signal is then generated relative to the biased operating level, for example, by deviating from the bias level as the magnetic transitions recorded on the disk adjust the resistance of the MR element. An initial nominal bias is typically selected for the heads in each disk drive, wherein the initial nominal bias may be determined relative to an average sensitivity of a number of manufactured heads. However, for certain heads the initial nominal bias may be too high or too low causing the head to be over or under sensitive. As a result, the amplitude of the read signal may be too high or too low for the control circuitry to accurately detect the servo sync marks when attempting to synchronize to the embedded servo sectors.

BRIEF DESCRIPTION OF THE DRAWINGS

FIG. 1A shows a disk drive according to an embodiment of the present invention comprising a disk including a plurality of servo sectors, a head actuated over the disk, and control circuitry.

FIG. 1B shows a format of a servo sector according to an embodiment of the present invention.

FIG. 1C is a flow diagram executed by the control circuitry according to an embodiment of the present invention wherein a bias setting for the head is adjusted in response to a gain setting for the read signal.

DETAILED DESCRIPTION OF EMBODIMENTS OF THE INVENTION

Figure 2A:
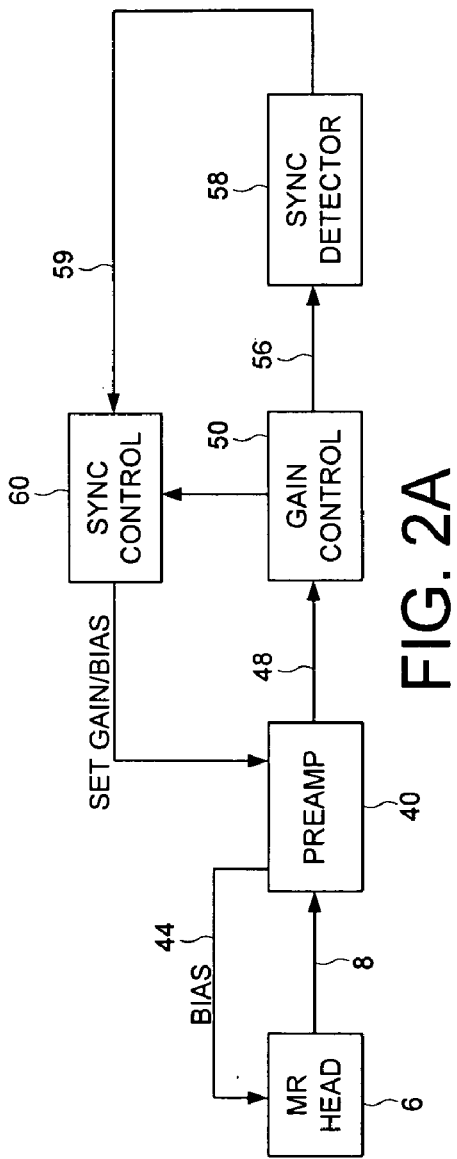
FIG. 2A shows control circuitry according to an embodiment of the present invention including a gain control circuit that is adjusted when an attempt to synchronize to the servo sectors fails, and circuitry for adjusting the bias setting for the head when the synchronization attempt fails with the adjusted gain control setting.

FIG. 1A shows a disk drive according to an embodiment of the present invention comprising a disk 2 including a plurality of servo sectors $4_0$-$4_N$, a head 6 actuated over the disk 2, the head 6 for generating a read signal 8, and control circuitry 10 including a gain control circuit for adjusting a gain of the read signal 8 in response to a gain setting. The control circuitry 10 executes the flow diagram of FIG. 1C wherein a bias setting is initialized for the head, and the gain setting for the read signal is initialized (step 12). The read signal 8 is processed to detect at least one of the servo sectors (step 14), and when at least one of the servo sectors is not detected (step 16), the gain setting is adjusted (step 18). The read signal is processed with the adjusted gain setting to detect at least one of the servo sectors (step 14), and when at least one of the servo sectors is not detected with the adjusted gain setting (step 16), the bias setting is adjusted in response to the adjusted gain setting (step 20).

In the embodiment of FIG. 1A, the servo sectors $4_0$-$4_N$ define a plurality of data tracks 24. The control circuitry 10 processes the read signal 8 emanating from the head 6 to demodulate the embedded servo sectors $4_0$-$4_N$ and generate a position error signal (PES) representing a radial offset of the head 6 from a target track 24. The control circuitry 10 processes the PES with a suitable servo compensator to generate a control signal 26 applied to a voice coil motor (VCM) 28. The VCM 28 rotates an actuator arm 30 about a pivot in order to actuate the head 6 radially over the disk 2 in a direction that decreases the PES.

In an embodiment shown in FIG. 1B, each servo sector $4_i$ comprises a preamble 32 for storing a periodic pattern, which allows proper gain adjustment and timing synchronization of the read signal, and a sync mark 34 for storing a special pattern used to symbol synchronize to a servo data field 36. The servo data field 36 stores coarse head positioning information, such as a track address, used to position the head over a target data track during a seek operation. Each servo sector $4_i$ may further comprise groups of servo bursts 38 (e.g., A, B, C and D bursts), which comprise a number of consecutive transitions recorded at precise intervals and offsets with respect to a data track centerline. The groups of servo bursts 38 provide fine head position information used for centerline tracking while accessing a data track during write/read operations.

When the disk drive is powered on for the first time, the control circuitry 10 positions the head 6 (or heads) over the disk 2 and attempts to synchronize to the servo sectors $4_0$-$4_N$ by acquiring the preamble 32 and detecting the sync mark 34 in the servo sectors. However, the initial bias setting selected for the head 6 may cause the head 6 to be over or under sensitive resulting in a read signal 8 having too high an amplitude or too low an amplitude to detect the servo sectors $4_0$-$4_N$. That is, the gain control in the control circuitry 10 may be unable to adjust the gain of the read signal 8 enough to bring its amplitude within an acceptable range to be able to detect the servo sectors $4_0$-$4_N$.

In the embodiment shown in FIG. 1C, the control circuitry adjusts the bias setting in response to the adjusted gain setting when the gain setting reaches a first predetermined level (step 22). For example, the control circuitry may increase the bias setting when the gain setting increases to a maximum level. That is, when the gain setting increases to a maximum level, it means the read signal amplitude is too low to be able to detect the sync marks in the servo sectors. Therefore, the bias setting is increased in order to increase the sensitivity of the head. Similarly, the control circuitry may decrease the bias setting when the gain setting decreases to a minimum level. That is, when the gain setting decreases to a minimum level, it means the read signal amplitude is too high to be able to detect the sync marks in the servo sectors. Therefore, the bias setting is decreased in order to decrease the sensitivity of the head.

Figure 2B:
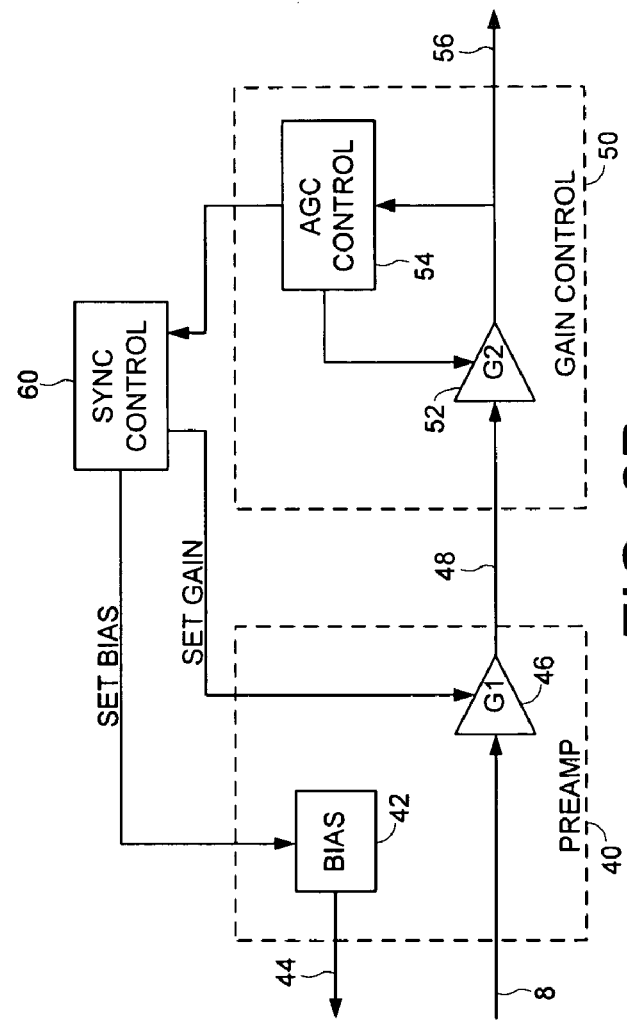
FIG. 2B shows an embodiment of the present invention wherein a preamp circuit comprising a first amplifier is configured with a fixed gain setting when processing the read signal, and the gain control circuit comprises a second amplifier configured with an adaptive gain setting when processing the read signal.

FIGS. 2A and 2B shows control circuitry according to an embodiment of the present invention comprising a preamp circuit 40 which comprises suitable circuitry 42 for generating a bias signal 44 applied to the head 6. Any suitable head 6 may be employed in the embodiments of the present invention, such as a magnetoresistive (MR) head that operates with a suitable bias current or bias voltage. In one embodiment, the preamp circuit 40 comprises a suitable amplifier G1 46 for amplifying the read signal 8 with a gain that remains fixed while processing the read signal 8. The pre-amplified read signal 48 is further amplified by an adaptive gain control circuit 50 which adapts the amplitude of the read signal 48 using an amplifier G2 52 and a suitable gain control algorithm 54 while processing the read signal 48. The amplified read signal 56 output by the adaptive gain control circuit 50 is processed by a sync mark detector 58 to detect the sync mark 34 in the servo sector. The sync mark detector 58 may comprise suitable read channel circuitry for filtering the read signal as well as implementing timing recovery and data detection. The sync mark detector 58 generates a status signal 59 indicating whether a servo sync mark was successfully detected. Suitable sync control circuitry 60 evaluates the status signal 59 to adjust the bias setting for the head 6 in response to the gain control setting (one or both of the fixed gain setting of the preamp circuit 40 or the adaptive gain setting of the gain control circuit 50).

Figure 3A:
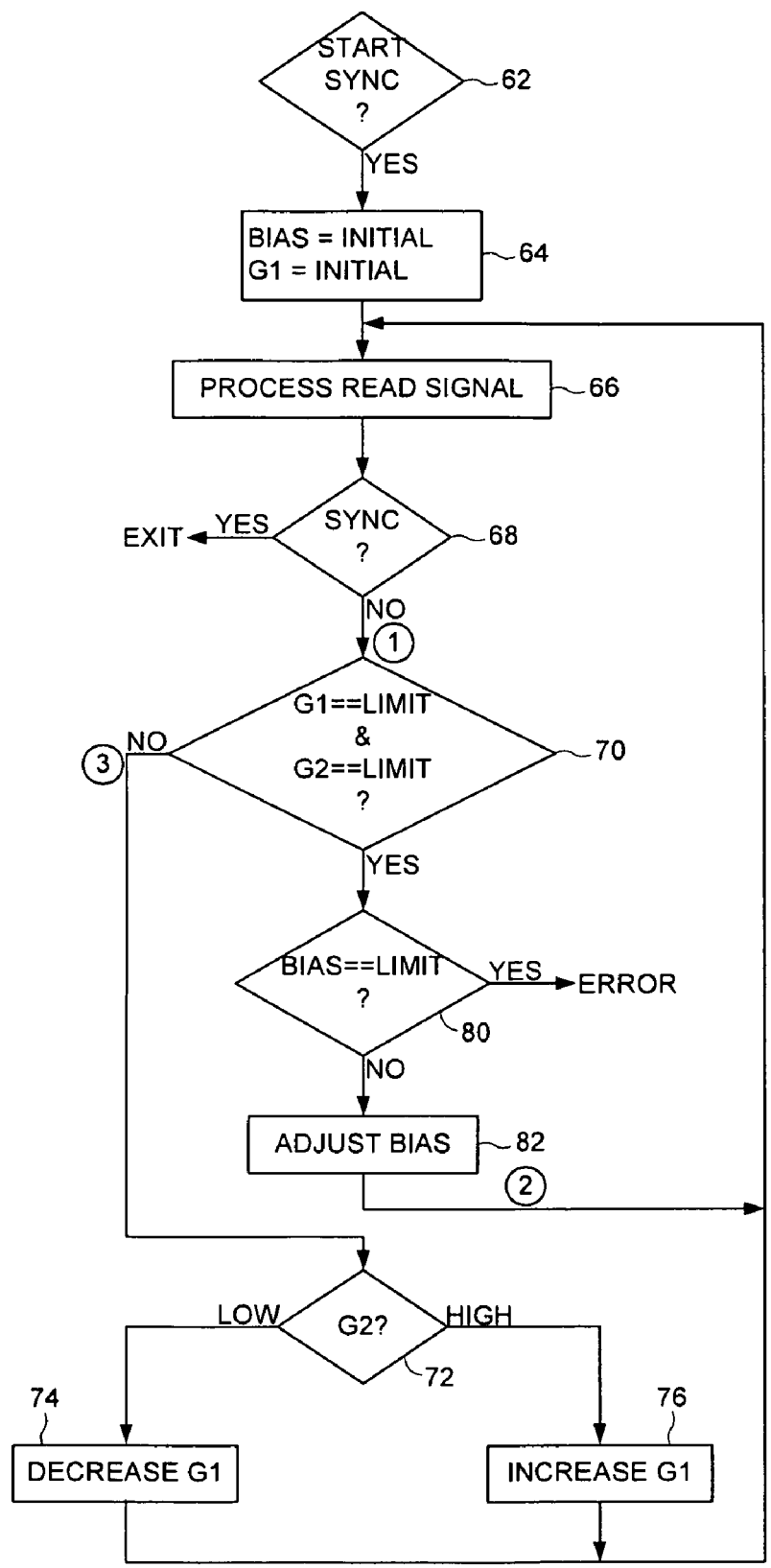
FIG. 3A is a flow diagram according to an embodiment of the present invention wherein the bias setting for the head is adjusted when the gain control settings reach a predetermined limit.

FIG. 3A is a flow diagram according to an embodiment of the present invention wherein when the disk drive is powered on and attempts to synchronize to the servo sectors (step 62), the bias setting for the head and the gain setting of the gain control are initialized (step 64). The read signal is processed (step 66) to detect the sync marks in the servo sectors, wherein if the sync marks cannot be detected (step 68), the gain setting of the preamp and the gain setting of the adaptive gain control are evaluated (step 70). If the gain settings have not reached a limit, then the gain setting of the adaptive gain control is evaluated (step 72). If the gain setting of the adaptive gain control is low, then the gain setting for the preamp G1 is decreased (step 74), and if the gain setting of the adaptive gain control is high, then the gain setting for the preamp G1 is increased (step 76). If the gain settings have reached a limit after the synchronization attempt fails (step 70), and the bias setting has not reached its limit (step 80), then the bias setting is adjusted (step 82) in response to the gain settings.

Figure 3B:
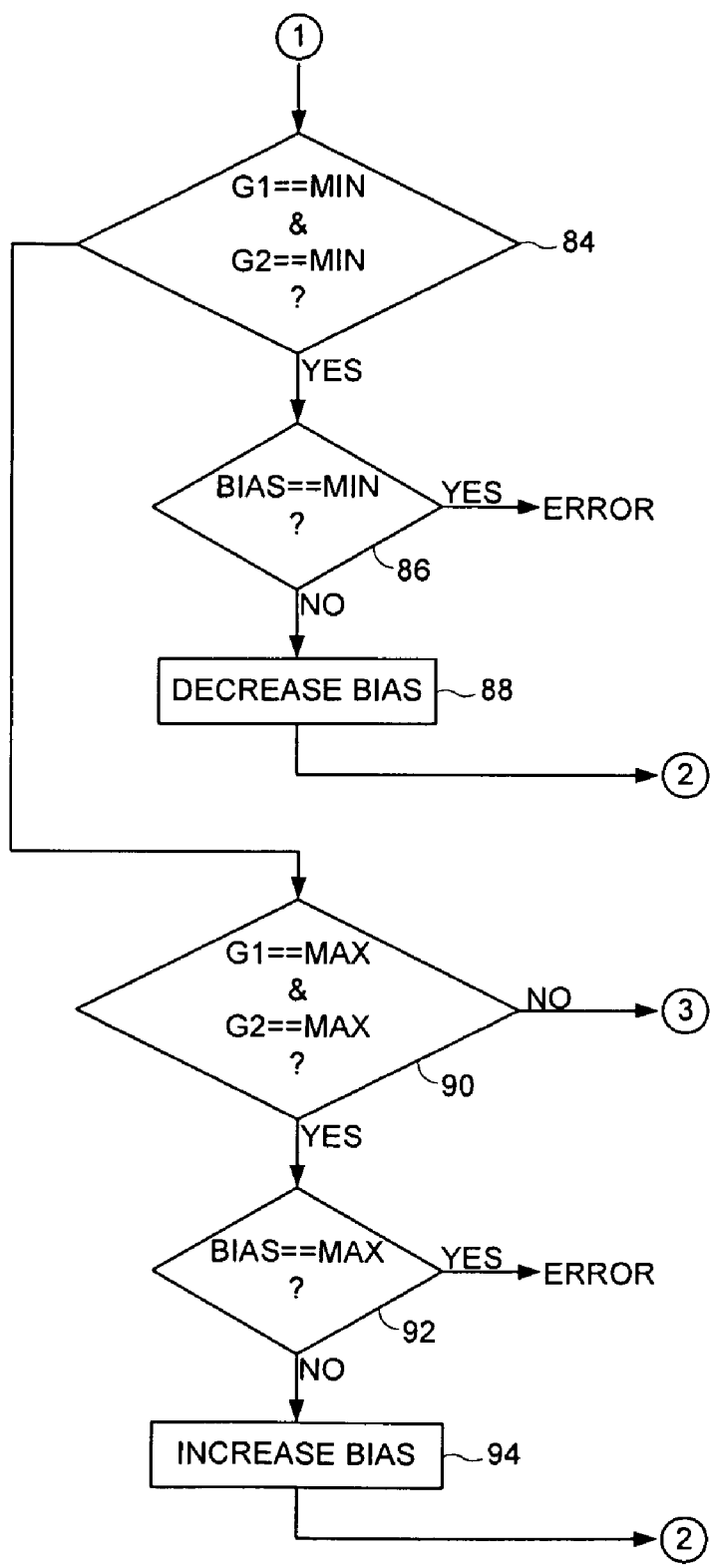
FIG. 3B is a flow diagram according to an embodiment of the present invention wherein the bias setting is decreased when the gain settings reach a minimum, and the bias setting is increased when the gain settings reach a maximum.

In an embodiment shown in the flow diagram of FIG. 3B, if the gain settings have reached a minimum after the synchronization attempt fails (step 84), and if the bias setting has not reached a minimum (step 86), then the bias setting for the head is decreased (step 88). If the gain settings have reached a maximum after the synchronization attempt fails (step 90), and if the bias setting has not reached a maximum (step 92), then the bias setting for the head is increased (step 94).

The bias setting may be adjusted in any suitable manner to adjust the sensitivity of the head. In one embodiment, the bias setting is adjusted (incremented or decremented) by a fine delta equal to the resolution step of the bias settings. In another embodiment, the bias setting may be adjusted (incremented or decremented) by a coarse delta equal to multiple resolution steps of the bias setting, and in one embodiment, the delta may be reduced as the bias setting converges to an optimal value.

In one embodiment, after the bias setting has been adjusted to a level that enables successful servo synchronization, the adjusted bias setting is saved in a non-volatile memory (e.g., a flash memory). In this manner, when the disk drive is subsequently powered on, the bias setting can be read from the non-volatile memory and used to synchronize to the servo sectors. In another embodiment, the bias setting may be re-calibrated over the life of the disk drive if a subsequent attempt to synchronize to the servo sectors fails. This may be necessary if the characteristics of the head change over time, or if changes in environmental conditions, such as changes in temperature, change the sensitivity of the head.

In one embodiment, the adjusted bias setting that enables servo synchronization may be further optimized using any suitable calibration algorithm, and in one embodiment, the adjusted bias setting may be used as an input parameter to the calibration algorithm (e.g., to initialize or limit the calibration algorithm). In addition, the preamp gain G1 46 that enables servo synchronization may be further optimized using any suitable calibration algorithm after successfully synchronizing to the servo sectors.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo sectors;
   a head actuated over the disk, the head for generating a read signal;
   a gain control circuit for adjusting a gain of the read signal in response to a gain setting;
   control circuitry operable to:

initialize a bias setting for the head;
initialize the gain setting for the read signal;
process the read signal to detect at least one of the servo sectors;
adjust the gain setting when at least one of the servo sectors is not detected;
process the read signal with the adjusted gain setting to detect at least one of the servo sectors; and
adjust the bias setting in response to the adjusted gain setting when at least one of the servo sectors is not detected with the adjusted gain setting.

2. The disk drive as recited in claim 1, wherein the control circuitry adjusts the bias setting in response to the adjusted gain setting when the gain setting reaches a first predetermined level.

3. The disk drive as recited in claim 2, wherein the control circuitry decreases the bias setting when the gain setting decreases to the first predetermined level.

4. The disk drive as recited in claim 2, wherein the control circuitry increases the bias setting when the gain setting increases to the first predetermined level.

5. The disk drive as recited in claim 1, wherein the gain control circuit comprises:
a first amplifier configured with a fixed gain setting when processing the read signal; and
a second amplifier configured with an adaptive gain setting when processing the read signal.

6. The disk drive as recited in claim 5, wherein the control circuitry adjusts the fixed gain setting in response to the adaptive gain setting when at least one of the servo sectors was not detected.

7. The disk drive as recited in claim 5, wherein the control circuitry increases the fixed gain setting when the adaptive gain setting increases to a second predetermined level.

8. The disk drive as recited in claim 5, wherein the control circuitry decreases the fixed gain setting when the adaptive gain setting decreases to a second predetermined level.

9. The disk drive as recited in claim 5, wherein the control circuitry adjusts the bias setting in response to the fixed gain setting.

10. The disk drive as recited in claim 5, wherein the control circuitry adjusts the bias setting in response to the fixed gain setting and the adaptive gain setting.

11. A method of operating a disk drive, the disk drive comprising a disk including a plurality of servo sectors, a head actuated over the disk, the head for generating a read signal, and a gain control circuit for adjusting a gain of the read signal in response to a gain setting, the method comprising:
initializing a bias setting for the head;
initializing the gain setting for the read signal;
processing the read signal to detect at least one of the servo sectors;
adjusting the gain setting when at least one of the servo sectors is not detected;
processing the read signal with the adjusted gain setting to detect at least one of the servo sectors; and
adjusting the bias setting in response to the adjusted gain setting when at least one of the servo sectors is not detected with the adjusted gain setting.

12. The method as recited in claim 11, further comprising adjusting the bias setting in response to the adjusted gain setting when the gain setting reaches a first predetermined level.

13. The method as recited in claim 12, further comprising decreasing the bias setting when the gain setting decreases to the first predetermined level.

14. The method as recited in claim 12, further comprising increasing the bias setting when the gain setting increases to the first predetermined level.

15. The method as recited in claim 11, wherein the gain control circuit comprises:
a first amplifier configured with a fixed gain setting when processing the read signal; and
a second amplifier configured with an adaptive gain setting when processing the read signal.

16. The method as recited in claim 15, further comprising adjusting the fixed gain setting in response to the adaptive gain setting when at least one of the servo sectors was not detected.

17. The method as recited in claim 15, further comprising increasing the fixed gain setting when the adaptive gain setting increases to a second predetermined level.

18. The method as recited in claim 15, further comprising decreasing the fixed gain setting when the adaptive gain setting decreases to a second predetermined level.

19. The method as recited in claim 15, further comprising adjusting the bias setting in response to the fixed gain setting.

20. The method as recited in claim 15, further comprising adjusting the bias setting in response to the fixed gain setting and the adaptive gain setting.

\* \* \* \* \*